(12) United States Patent
Zhou

(10) Patent No.: US 9,567,028 B2
(45) Date of Patent: Feb. 14, 2017

(54) VEHICLE DECELERATION WARNING LIGHT

(71) Applicant: Wesley Zhou, Aliso Viejo, CA (US)

(72) Inventor: Wesley Zhou, Aliso Viejo, CA (US)

(*) Notice: Subject to any disclaimer, the term of this patent is extended or adjusted under 35 U.S.C. 154(b) by 0 days.

(21) Appl. No.: 14/986,458

(22) Filed: Dec. 31, 2015

(65) Prior Publication Data
US 2016/0114846 A1 Apr. 28, 2016

Related U.S. Application Data

(63) Continuation-in-part of application No. 14/198,324, filed on Mar. 5, 2014, now abandoned.

(51) Int. Cl.
| | |
|---|---|
| *B60Q 1/44* | (2006.01) |
| *B62J 99/00* | (2009.01) |
| *B62J 6/00* | (2006.01) |
| *B60Q 1/50* | (2006.01) |
| *B60Q 1/26* | (2006.01) |
| *B60Q 1/56* | (2006.01) |

(52) U.S. Cl.
CPC .............. *B62J 6/003* (2013.01); *B60Q 1/2696* (2013.01); *B60Q 1/445* (2013.01); *B60Q 1/50* (2013.01); *B60Q 1/56* (2013.01); *B62J 2300/008* (2013.01)

(58) Field of Classification Search
USPC ....... 340/471, 479, 464, 467, 468, 463, 466, 340/815.4
See application file for complete search history.

(56) References Cited

U.S. PATENT DOCUMENTS

| | | | | | |
|---|---|---|---|---|---|
| 3,601,564 | A | * | 8/1971 | Ellison | H01H 35/14 200/61.48 |
| 5,309,141 | A | * | 5/1994 | Mason | B60Q 1/52 200/61.45 R |
| 6,411,204 | B1 | * | 6/2002 | Bloomfield | B60Q 1/302 340/464 |
| 8,405,498 | B1 | * | 3/2013 | Smith | B60R 21/01 340/463 |
| 8,816,586 | B2 | * | 8/2014 | Marcove | B60Q 1/2607 315/77 |
| 9,050,930 | B2 | * | 6/2015 | Walsh | B60Q 1/525 |
| 2005/0237172 | A1 | * | 10/2005 | Boomershine, III | B60Q 1/44 340/467 |
| 2005/0253700 | A1 | * | 11/2005 | Keena | B60Q 1/448 340/464 |
| 2005/0280422 | A1 | * | 12/2005 | Kishibata | G01R 31/025 324/522 |
| 2007/0182677 | A1 | * | 8/2007 | Lee | H05B 33/0803 345/82 |
| 2007/0258262 | A1 | * | 11/2007 | Hanyon | B60Q 1/56 362/600 |
| 2009/0322508 | A1 | * | 12/2009 | Malik | B60Q 1/447 340/471 |

(Continued)

*Primary Examiner* — Fekadeselassie Girma
(74) *Attorney, Agent, or Firm* — Lapple Ubell IP Law LLP; Franklin D. Ubell

(57) ABSTRACT

A vehicle license plate holder having a frame including a receptacle for a license plate, first and second LED light sources disposed on each side of the frame, and one or more power generators attached to the frame. The frame also mounts an electronic circuit module including a battery and configured to detect deceleration of a vehicle and to illuminate the first and second LED light sources in response to detection of the deceleration.

15 Claims, 5 Drawing Sheets

(56) References Cited

U.S. PATENT DOCUMENTS

| | | | |
|---|---|---|---|
| 2010/0320946 A1* | 12/2010 | Ueda | H02P 6/20 318/400.3 |
| 2011/0251768 A1* | 10/2011 | Luo | B60W 30/12 701/70 |
| 2012/0167421 A1* | 7/2012 | Rowley | B60D 1/58 40/427 |
| 2013/0033370 A1* | 2/2013 | Langlois | B62J 6/005 340/432 |
| 2014/0184615 A1* | 7/2014 | Bergquist | G09G 5/02 345/503 |
| 2014/0253315 A1* | 9/2014 | Bement | B60Q 1/447 340/479 |
| 2014/0265843 A1* | 9/2014 | Troxler | B60Q 1/2673 315/77 |
| 2014/0354419 A1* | 12/2014 | Frier | B60R 25/10 340/432 |
| 2015/0194082 A1* | 7/2015 | McEwan | G09F 21/048 40/209 |
| 2015/0250247 A1* | 9/2015 | Beckers | A42B 3/044 2/422 |

* cited by examiner

VEHICLE DECELERATION WARNING LIGHT

RELATED APPLICATIONS

This application is a continuation-in-part of U.S. patent application Ser. No. 14/198,324, filed Mar. 5, 2014, entitled, "Vehicle Deceleration Warning Light," the contents of which is incorporated herein by reference in its entirety.

BACKGROUND

Field of the Disclosure

The subject disclosure relates to vehicle safety devices and more particularly to a warning light for warning of sudden deceleration of a vehicle.

DESCRIPTION OF RELATED ART

Vehicle brake warning lights activated by brake depression are known in the art. However, they are ineffective in warning of quick deceleration which may occur without brake depression, such as may be experienced, for example, with motorcycles.

SUMMARY OF THE INVENTION

An illustrative embodiment of vehicle license plate holder according to the subject disclosure comprises a frame having a receptacle for a license plate, first and second LED light sources disposed on each side of the frame, and one or more power generators attached to the frame. An electronic circuit module is located on the back of the frame and is configured to detect deceleration of a vehicle to which the license plate holder is attached and to illuminate the first and second LED light, sources in response to detection of the deceleration. In one embodiment, the one or more power generators comprise first and second wind powered turbine generators positioned on respective sides of the license plate holder. In other embodiments, the one or more power generators comprise a solar power generator or a combination of solar power and wind turbine power generators.

In one illustrative embodiment, the electronic circuit module comprises an accelerometer chip coupled through an A/D converter to a controller circuit, a battery charging circuit, and switching circuitry configured to switch power to the first and second LED light sources. In such an embodiment, the controller circuit is configured to control the battery charging circuit and the switching circuitry. In one embodiment, the controller circuit may comprise a microprocessor.

DETAILED DESCRIPTION

Figure 1:
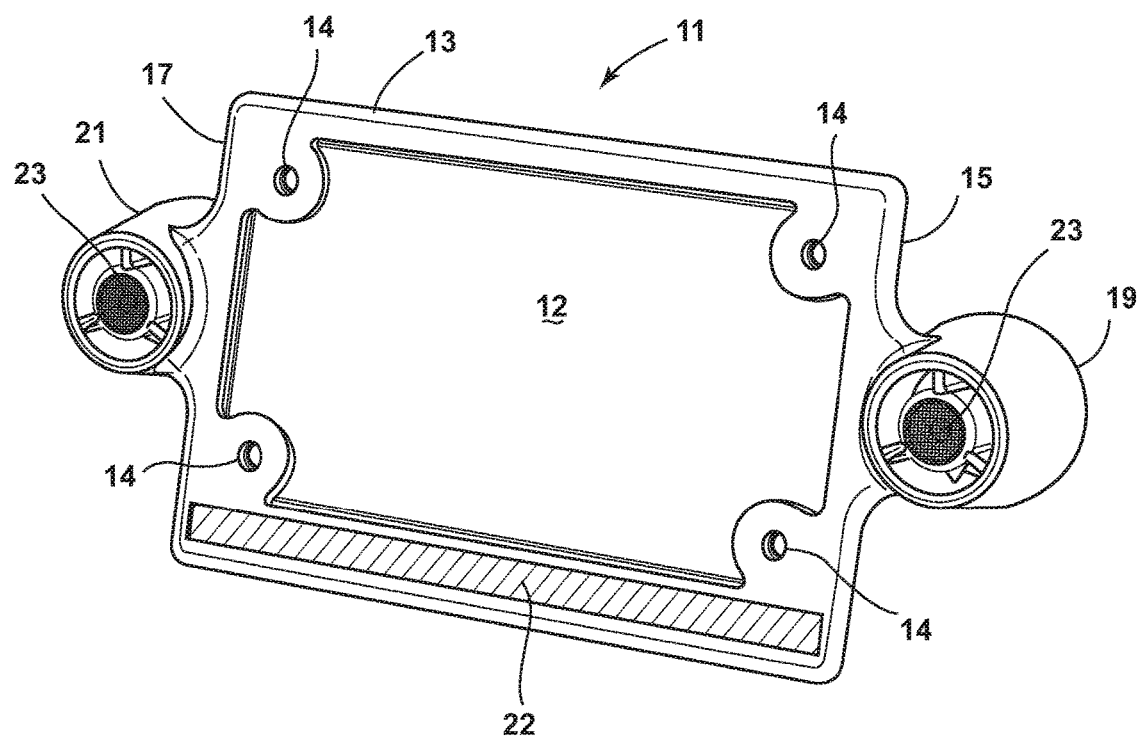
FIG. 1 is a front perspective view of an illustrative embodiment.
Figure 2:
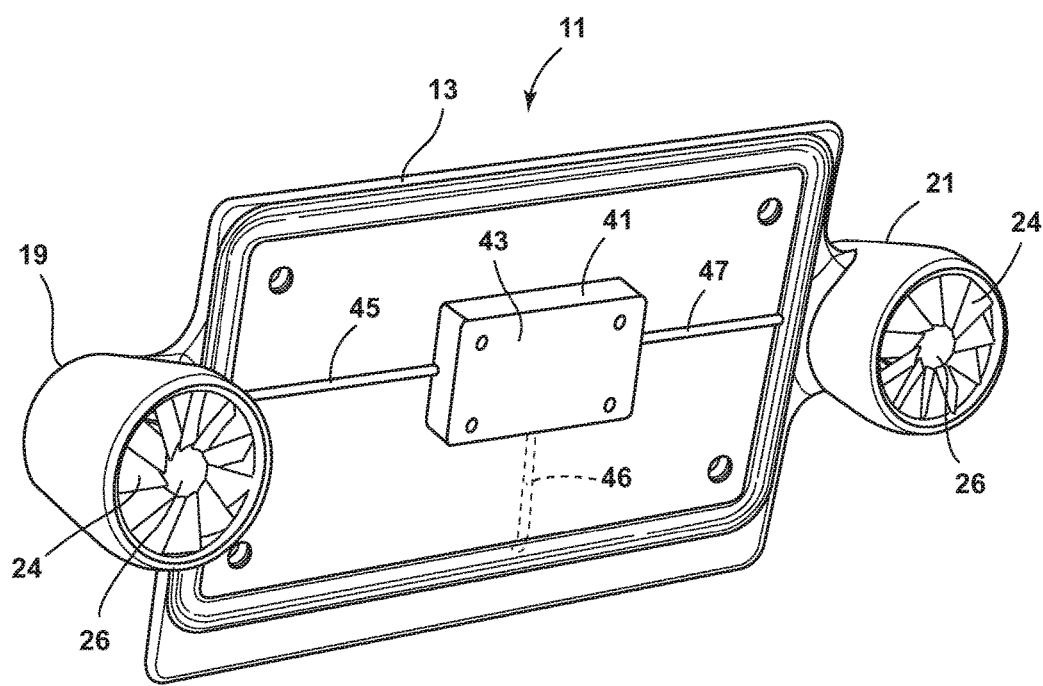
FIG. 2 is a back perspective view of the embodiment of FIG. 1.

An illustrative embodiment of a vehicle warning light 11 is shown in FIGS. 1 and 2. The illustrative embodiment includes a license plate frame 13 for use on motor vehicles, which includes a receptacle 12 for receiving a license plate, as well as mounting holes 14. On the respective sides 15, 17 of the frame 13 are formed two air powered generators 19, 21 that generate DC current. A solar cell 22 may also be installed in the frame 13, or alternatively, in place of the generators 19, 21. Rear facing LED warning lights 23, which may comprise one or more LEDs, are centrally positioned on the turbine pods. In one embodiment, the device 11 is completely self-contained and has no external switches.

As seen in FIG. 2, the wind turbines 19, 21 include respective turbine blades 24 mounted on respective shafts 26 which are rotatably mounted in the central housing 28 of each turbine pod. Each central housing 28 is positioned and supported in the center of each pod by respective struts 30.

When the motor vehicle is moving, air flows through the turbine blades 24 which then spin to generate DC power. When the motor vehicle starts decelerating by either closing the throttle or applying the brakes an accelerometer S5 (FIG. 4) recognizes the deceleration and switches on the LED lights 23. As soon as DC power is applied, the system electronics (FIG. 4) autonomously begins monitoring the acceleration and deceleration of the motor vehicle. As soon as a forward deceleration situation is sensed the electronics will turn on the LED warning lights 23 until one of these situations occurs:

1. there is no more DC power available for powering the LEDs 23 and/or the electronics.
2. the forward deceleration is no longer occurring.

In one embodiment, as shown in FIG. 2, the electronics for controlling the LEDs 23 is contained in a module 41, which may be molded as part of the license plate holder 13 or separately attached thereto. In one embodiment, the module 41 includes a removable water tight cover 43, which provides access to the electronics within the module. Suitable electrical leads or cables 45, 47 provide power to the LEDs 23 and transmit voltage from the power generators, e.g., 19, 21 to a rechargeable battery 51 located in the module 41. A lead 46 may transmit power from the solar cell 22 to the rechargeable battery 51. In one embodiment, the electrical leads or cables 45, 46, 47 may reside in channels or raceways which are pre-formed in the license plate structure and which may be covered and held in place by suitable covers or by epoxy or other methods. In an alternate embodiment, the electrical leads or cables may be installed during the molding process of a molded embodiment of the license plate holder and hence encapsulated in, for example, plastic or other molded material.

Figure 4:
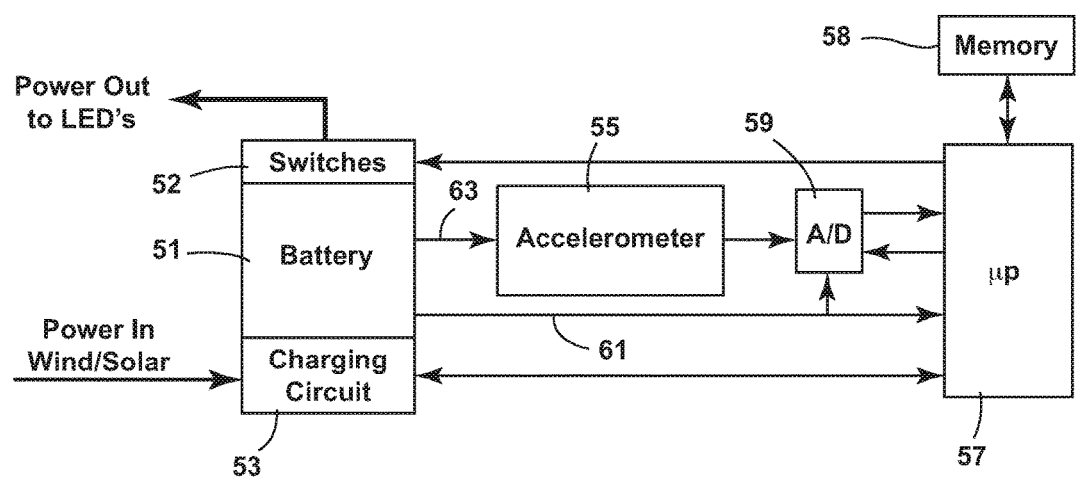
FIG. 4 is a schematic circuit diagram of electronic circuitry of an illustrative embodiment.

The electrical componentry within the module 41 is illustrated FIG. 4. As shown, the componentry includes a battery 51, suitable switches 52 to control application of power to light the LEDs 23 and a battery charging circuit 53, which receives power from the power generators, e.g. 19, 21. In one embodiment, the battery 51 may be a lithium ion battery.

In an illustrative embodiment, the electrical componentry further includes an accelerometer chip 55 and a controller circuit, such as for example, a microprocessor or microcontroller 57, together with suitable memory 58. In one embodiment, the accelerometer chip 53 may be part no. ADXL330 as manufactured by Analog Devices, Inc., One Technology Way, Norwood, Mass.

The ADXL330 is a 3-axis accelerometer measurement system on a single monolithic IC, which has a measurement range of ±3 g minimum. It contains a polysilicon surface micromachined sensor and signal conditioning circuitry to implement an open-loop accelerometer measurement architecture. The output signals are analog voltages that are proportional to acceleration. The accelerometer can measure the static acceleration of gravity in tilt sensing applications as well as dynamic acceleration resulting from motion, shock, or vibration.

The sensor is a polysilicon surface micromachined structure built on top of a silicon wafer. Polysilicon springs suspend the structure over the surface of the wafer and provide a resistance against acceleration forces. Deflection of the structure is measured using a differential capacitor that consists of independent fixed plates and plates attached to the moving mass. The fixed plates are driven by 180° out-of-phase square waves. Acceleration deflects the moving mass and unbalances the differential capacitor resulting in a sensor output whose amplitude is proportional to acceleration. Phase-sensitive demodulation techniques are then used to determine the magnitude and direction of the acceleration.

In one embodiment, the demodulator output may be amplified and brought off-chip through a resistor. The user may then set the signal band-width of the device by adding a capacitor. This filtering improves measurement resolution and helps prevent aliasing.

In one embodiment, the outputs of the accelerometer 53 are A to D converted by converter 59 and supplied as inputs to the microprocessor 57. If the microprocessor 57 detects a sudden deceleration based on the accelerometer inputs, it causes power to be immediately supplied to the LEDs 23 via switches 52 to generate a warning light signal. Additionally, the microprocessor 57 monitors the charge state of the battery 51 and controls charging of the battery 51 by the auxiliary power supply sources. The battery 51 in turn supplies operating voltage on respective lines, e.g. 61, 63 to the microprocessor 55 and accelerometer 53. In some embodiments, suitable circuitry may be implemented to provide different operating voltages to different components.

Figure 3:
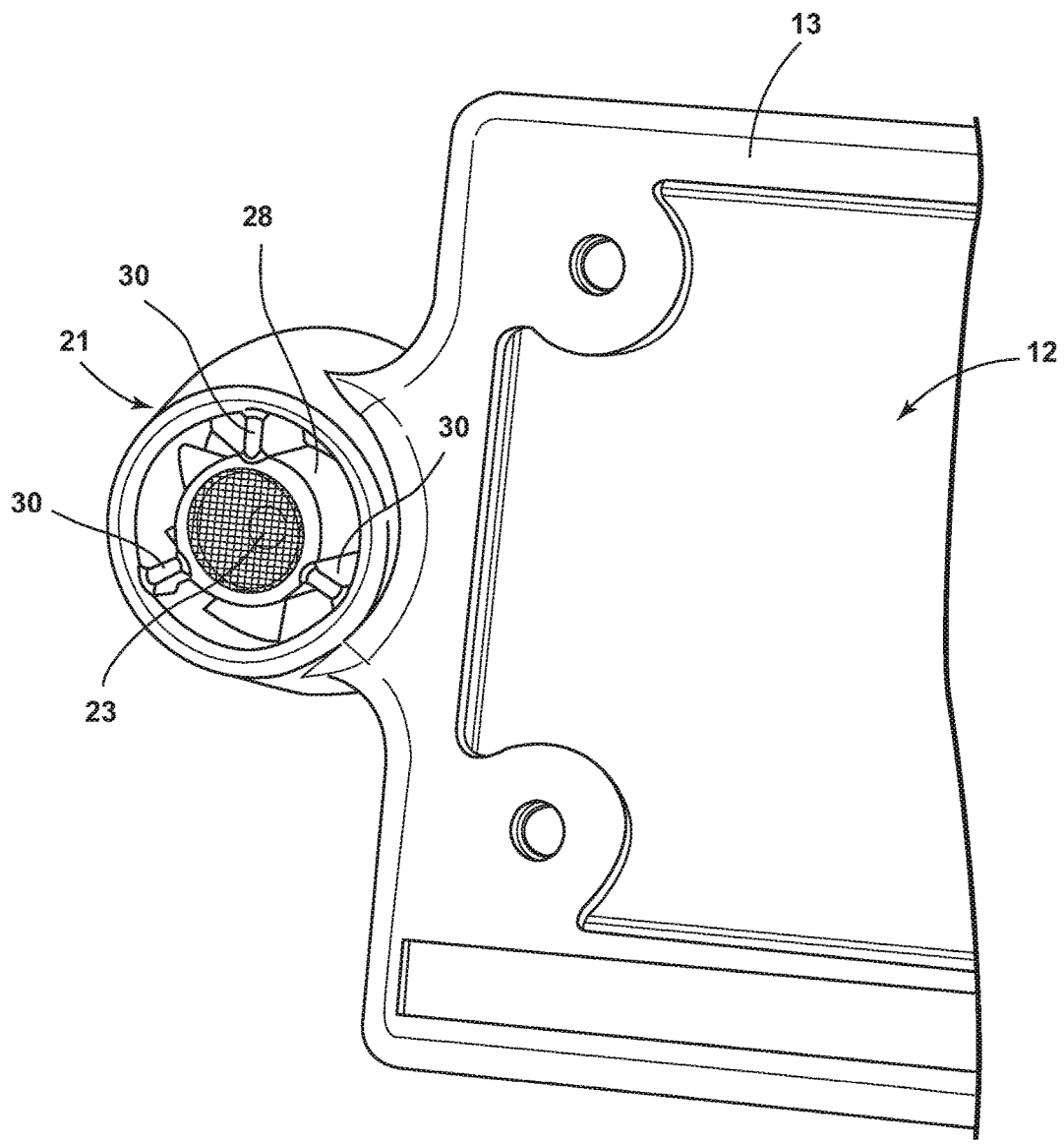
FIG. 3 is an enlarged fragmentary view of a portion of FIG. 1.

Embodiments such as disclosed in FIG. 4 have proven to have drawbacks because accelerometers have proven susceptible to faulty triggering of the warning light(s) particularly in connection with a single track vehicle such as a motorcycle which leans into turns to counter centrifugal forces. Through further investigation, it has been discovered that the wind turbine speed itself can be monitored to provide a highly reliable detection of deceleration. An illustrative embodiment according to this discovery may employ the license plate holder and wind turbine structure of FIGS. 1-3 but with different deceleration detection circuitry, an illustrative embodiment of which is shown in FIG. 5.

Figure 5:
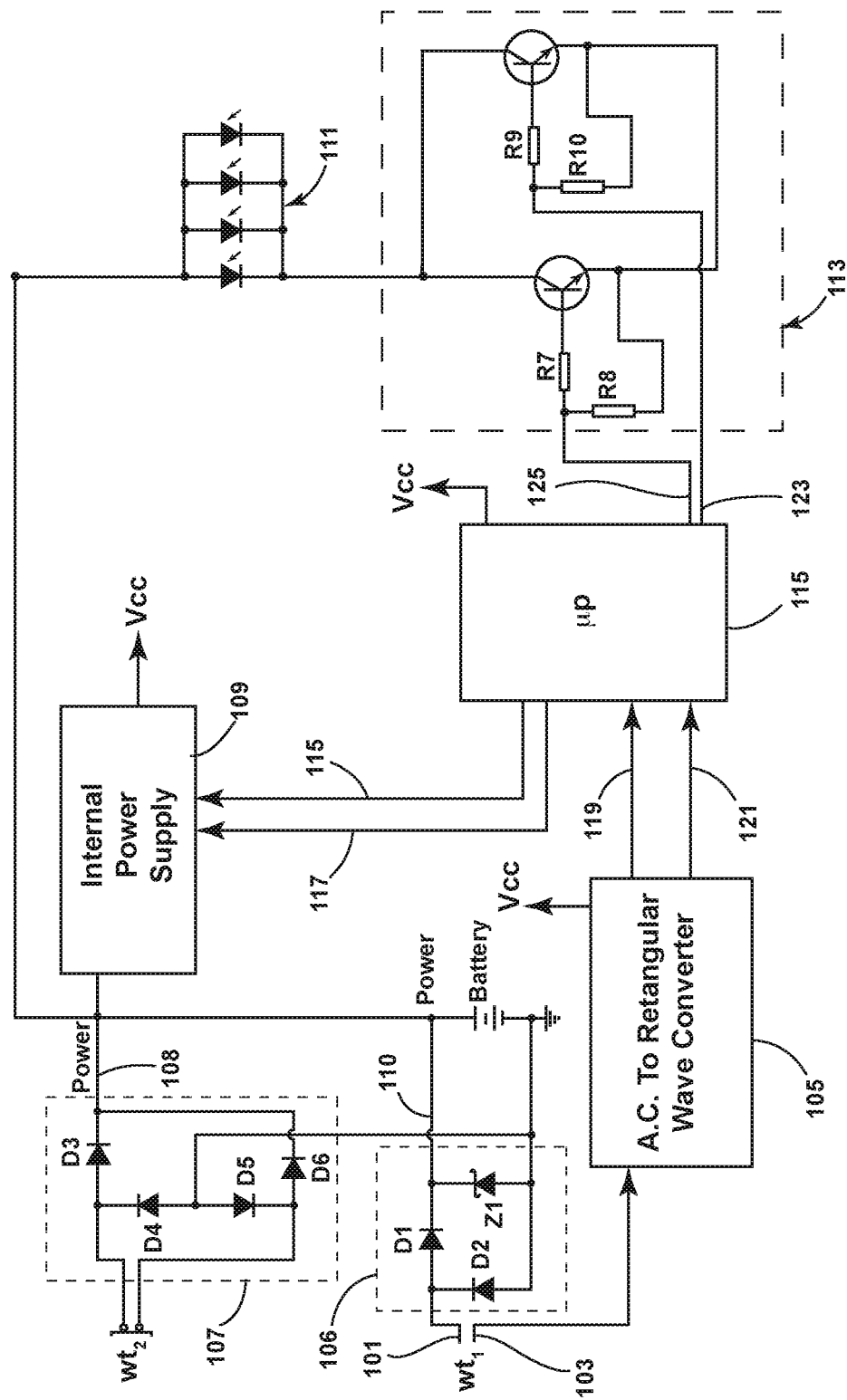
FIG. 5 is a schematic circuit diagram of electronic circuitry of a second embodiment.

According to the circuit of FIG. 5, the A.C. output voltage of a first wind turbine generator WT1 is applied across input terminals 101, 103 to a first input circuit 106 comprising a first diode D1, a second diode D2, and a Zener diode Z1. In particular, terminal 101 is connected to the anode of diode D1, and the cathode of diode D2, whose opposite terminal is connected to ground. The cathode of the diode D1 is connected to the positive side of a rechargeable battery B1.

The Zener diode Z1 is connected across the battery B1 to limit the voltage applied to the battery by the diode combination. The A.C. line signal from the turbine generator WT1 is supplied from terminal 103 to the input of an A.C. to square wave converter circuit 105.

Further according to the illustrative circuit of FIG. 5, the A.C. output voltage of a second wind turbine generator WT2 is applied across input terminals AC1 and AC2, which connect to a first input circuit 107 comprising as diode bridge formed by diodes D3, D4, D5, D6. The input circuit 107 provides a power output on a signal line 108.

The positive terminal of the battery B1 and the power output line 108 are connected in common and supply an input to an internal power supply 109 and to the anodes of a plurality of parallel connected LED's or other light sources shown at 111. The cathodes of the parallel connected LED's are connected in common to an LED driver circuit 113 comprising first and second transistors Q1, Q2 and suitable biasing resistors R7, R8 and R9, R10.

The internal power supply generates a D.C. internal supply voltage VCC, which is supplied to the microprocessor 115 and to the A.C. to square wave converter circuit 105. The microprocessor 115 in turn controls the internal power supply 109 via signal lines 115, 117 to maintain the supply voltage VCC. The microprocessor 105 further monitors input lines 119, 121 from the circuit 105 and, under selected conditions, triggers the LED driver 113 to illuminate the LED's 111 via control signals supplied on signal lines 123, 125. In one embodiment, the battery voltage supplied by the battery B1 is 3.7 volts D.C., and the Zener diode Z1 limits the voltage across the battery B1 to 4.5 volts maximum. These voltage values may of course be different in other embodiments.

In operation, miniature wind turbines, e.g., 19, 21, of illustrative embodiments are spinning and generating an A.C. output, which is used to charge the battery BR1. In one embodiment, the circuitry of FIG. 5 also may be included in a module, e.g. 41, which may be molded as part of the license plate holder, or attached, for example to the back of the license plate holder. At different motorcycle speeds, there will be a different volume of air feeding through the turbine blades, which varies the RPM of the turbine rotors, resulting in an A.C. output of varying frequency. In one embodiment, each wind turbine may generate about 1 watt of power and their output voltage is up to 10 volts A.C. depending on wind speed at no load. Other power and voltage outputs may be used in other embodiments.

According to the illustrative circuit of FIG. 5, a circuit 105 converts an A.C. input from a miniature wind turbine into a rectangular waveform, which is fed to the microprocessor 115 or other computing device. In one embodiment, the circuit 105 may be a dual variable-reluctance sensor interface IC, which converts the variable frequency A.C. into a rectangular wave form having a varying duty cycle, which is then fed to the microprocessor 115. An example of a suitable dual variable-reluctance interface IC is the Onsemi part number NVC1124 as available from ON Semiconductor Corp., Phoenix, Ariz. This IC is a dual channel device, and in the embodiment shown the A.C. signal on line is fed to first and second channel inputs and first and second outputs are supplied as respective inputs the microprocessor 115 on signal lines 119, 121. In other embodiments, a rectangular waveform or other digital waveform representative of RPM may be supplied on a single input line to a single input of the microprocessor or other computing device.

Based on the duty cycle of the input square wave, the microprocessor 115 determines the current wind turbine RPM and differentiates over time to determine whether the RPM is increasing, decreasing or staying the same. Selected set points or limits are programmed into the microprocessor code to determine when the LED's 111 should be turned on. In the illustrative embodiment, the microprocessor 115 supplies control signals to the LED driver circuit 113 to turn on the LED's 111. For example, in one illustrative embodiment, the warning lights (one or more LEDs in one embodiment) are turned on (a) if the turbine rotor speed reaches 2,000 RPM (revolutions per minute) or (b) if the turbine rotor speed changes more than 100 RPM (revolutions per minute) in 0.1 (one tenth) of a second. Various other LED turn-on set points or limits may be employed in other embodiments.

From the foregoing, those skilled in the art will appreciate that various adaptations and modifications of the just described preferred embodiment can be configured without departing from the scope and spirit of the invention. Therefore, it is to be understood that, within the scope of the appended claims, the invention may be practiced other than as specifically described herein.

What is claimed is:

1. A motor cycle license plate holder comprising:
   one or more LED warning lights; and
   electronic circuitry comprising:
   a dual variable reluctance sensor circuit supplied with a wind turbine-generated A.C. signal for converting said A.C. signal to a rectangular waveform representative of turbine rotor rpm (revolutions per minute) suitable for input to a microprocessor;
   a microprocessor configured to receive said rectangular waveform and to detect deceleration of the motorcycle by determining whether rotor rpm is decreasing and to cause illumination of the one or more LED warning lights if the rotor rpm decreases more than a selected amount over a selected time interval;
   a battery; and
   a battery charging circuit supplied with power derived from a wind turbine generated A.C. signal and configured to charge said battery.

2. The motorcycle license plate holder of claim 1 further comprising an internal power supply supplied with wind turbine A.C. signal derived power and configured to generate an internal supply voltage for powering said microprocessor and said dual variable reluctance sensor circuit.

3. The motorcycle license plate holder of claim 2 wherein said electronic circuitry is contained in a module molded as part of said license plate holder.

4. The motorcycle license plate holder of claim 2 further comprising first and second wind turbine generators attached to respective first and second sides of said license plate holder.

5. The motorcycle license plate holder of claim 2 wherein said electronic circuitry further comprises an LED driver circuit and wherein said microprocessor is configured to cause said LED driver circuit to turn on said one or more LED warning lights.

6. The motor cycle license plate holder of claim 1 wherein said rectangular waveform is a square wave.

7. The motor cycle license plate holder of claim 2 wherein said rectangular waveform is a square wave.

8. A motor cycle license plate holder comprising:
   one or more LED warning lights; and
   electronic circuitry comprising:
   a microprocessor;
   a first input circuit connected to receive a wind turbine generated A.C. input signal and comprising a plurality of diodes, the first input circuit being connected at a first connection point to a rechargeable battery:
   a second input circuit connected to receive a wind turbine generated A.C. input signal, the second input circuit comprising a plurality of diodes and supplying a power output at a point connected in common with said first connection point and to an input of an internal power supply;
   a dual variable reluctance sensor circuit having an input connected to receive a wind turbine-generated A.C. signal from said first input circuit and having an output connected to an input of said microprocessor;
   an LED driver circuit having at least one input connected to an output of said microprocessor and an output connected to said one or more LED warning lights;
   wherein said internal power supply has a supply voltage terminal connected to said microprocessor and to said dual variable reluctance sensor circuit.

9. The motorcycle license plate holder of claim 8 wherein said first input circuit is connected to the output of a first wind turbine generator and the second input circuit is connected to the output of a second wind turbine generator.

10. A method of detecting deceleration of a motorcycle and generating a warning light viewable from the rear of the motorcycle comprising:
    converting a wind turbine generated A.C. signal to a rectangular wave form representative of turbine rotor rpm and suitable for input to a microprocessor;
    employing a microprocessor to detect deceleration of the motorcycle by determining whether rotor rpm is decreasing and to cause illumination of one or more LED warning lights if the rotor rpm decreases more than a selected amount over a selected time interval; and
    employing a wind turbine generated A.C. signal to generate power for supply to said microprocessor.

11. The method of claim 10 further comprising employing dual variable reluctance sensor circuit to generate said rectangular waveform.

12. The method of claim 10 further comprising employing a wind turbine generated A.C. signal to charge a battery forming part of a circuit with said microprocessor.

13. The method of claim 10 wherein said rectangular waveform is a square wave.

14. The method of claim 11 wherein said rectangular waveform is a square wave.

15. The method of claim 12 wherein said rectangular waveform is a square wave.

* * * * *